United States Patent
Obuchi

[15] 3,653,292
[45] Apr. 4, 1972

[54] AUTOMATIC CONTOUR TRACING DEVICE

[72] Inventor: Kazuo Obuchi, 220 Isaida, Kamagawa, Odawara, Japan

[22] Filed: July 2, 1970

[21] Appl. No.: 52,058

[30] Foreign Application Priority Data

July 4, 1969 Japan..................................44/52947

[52] U.S. Cl..........................90/62, 219/125 PL, 266/23 B, 266/23 E
[51] Int. Cl........................................................B23c 9/00
[58] Field of Search.....................90/62, 13; 266/23 B, 23 D, 266/23 E, 23 K, 23 L, 23 M; 219/125, 125 PL

[56] References Cited

UNITED STATES PATENTS 2,403,514  7/1946  Franzen..............................266/23 B

*Primary Examiner*—Francis S. Husar
*Attorney*—Sughrue, Rothwell, Mion, Zinn & Macpeak

[57] ABSTRACT

A first arm pivots about a tracing point which is spaced a fixed distance from a steering axis supporting a steering wheel which in turn is spaced at a fixed distance from a common vertical plane including a plurality of rear wheels for an automatic contour tracing device. A compensating mechanism controls both arms to satisfy a particular mathematical relationship.

4 Claims, 4 Drawing Figures

PATENTED APR 4 1972  3,653,292

INVENTOR
KAZUO OBUCHI

BY Sughrue, Rothwell,
Mion, Zinn & Macpeak
ATTORNEYS

AUTOMATIC CONTOUR TRACING DEVICE

BACKGROUND OF THE INVENTION

1. Field of the Invention

The present invention relates to a device tracing a marking line on a metal plate, and specifically to a device for automatically tracing a marking line provided on a metal plate for use in the metal plate processing for shipbuilding, boiler manufacturing, bridge building and the like arts.

2. Description of the Prior Art

In the prior art, automatic contour tracing devices are well known which have a steering wheel running along the contour (marking line). One such conventional device is shown in FIG. 1. A steering wheel 1 having a steering axis 2 vertical to the paper is pivotally mounted, at the steering axis 2 thereof, to a structural member 5 such as a framework. The structural member 5 is integrally fixed with respect to an axis 4 for holding a shaft connecting a pair of driving and/or idler wheels 3 and 3'. For the convenience of explanation of the principle of the device, it is assumed that the axis 4 is perpendicular to the structural member 5. The steering wheel 1 is provided with an arm 6 at the steering axis 2 so that the arm 6 swings about the axis 2 together with the steering wheel 1. The arm 6 extends in the direction of advance of the steering wheel 1 and is provided at the end thereof with a contour detector 7. The contour detector 7 is spaced from the steering axis 2 by the distance of $a$.

The word "contour" used herein may not be a visible line but should be understood to cover any type of line which is detectable optically, electrically, magnetically, mechanically or by any other physical or chemical means. And it should be understood that the contour detector 7 may be of any type so long as it is able to detect the existence of a contour with the accuracy required and it can make an electrical or mechanical output signal indicating the deflection from the contour and the direction thereof.

In operation of the device shown in FIG. 1, the contour detector 7 detects the deflection of steering wheel 1 from the marking line 8 and the arm 6 having the contour detector 7 is rotated about the steering axis 2 through an electrical or mechanical servo system (not shown) to compensate for the deflection. By driving the driving wheels 3, 3' or the steering wheel 1, the device runs following the line 8 marked on the metal plate. It should be naturally understood that the driving wheels 3 and 3' should be driven through a differential driving system provided between the two wheels 3 and 3'.

If the contour 8 is regarded approximately as a circular arc of radius R, the deviation δ seen between the tracing point and the circular arc is given by the formula:

$$\delta = R - \sqrt{R^2 - a^2}$$

where the tracing point is a point of intersection of the steering axis with the surface of the metal plate to be processed.

It will be understood that it is easy to make the value of the deviation δ less than the allowable error limit by rendering the length of the arm 6 having the contour detector 7 at the end thereof much shorter than the minimum radius of curvature of the marking line to be traced. It should be noted that the length of the arm 6 cannot be made zero since it becomes impossible to trace the line due to the unstableness of the servo mechanism if the length of the arm 6 is zero.

In the automatic contour tracing device as described above the tracing point is hidden under the steering wheel since it is on the steering axis 2. This does not matter in the case that the steering wheel is used for a device for carrying baggage along a predetermined or desired path such as unmanned guided carriage. However, it is apparent that this is improper for an automatic contour tracing device for the purpose of processing, e.g. cutting, welding, etc., the metal plate along the marking line thereon.

In view of the disadvantages of the conventional automatic contour tracing device as described above, it has long been desired that an improved device overcoming the above described defects of the conventional device should be developed.

SUMMARY OF THE INVENTION

Therefore, the present invention provides an automatic contour tracing device in which the tracing point is not on the steering axis of the steering wheel so that the metal plate can be readily processed at the tracing point of the device.

In accordance with the present invention, it becomes possible to perform a physical or chemical process such as cutting, welding, punching, nibbling and the like at the tracing point of the contour tracing device.

BRIEF DESCRIPTION OF THE DRAWINGS

The present invention will be described in detail with reference to particular embodiments thereof referring to FIGS. 2 through 4.

The present invention will be described with particular embodiments thereof in comparison with the prior art and the objects and advantages of the present invention will be apparent from the following description taken in conjunction with the accompanying drawings in which.

DESCRIPTION OF THE PREFERRED EMBODIMENTS

Figure 2:
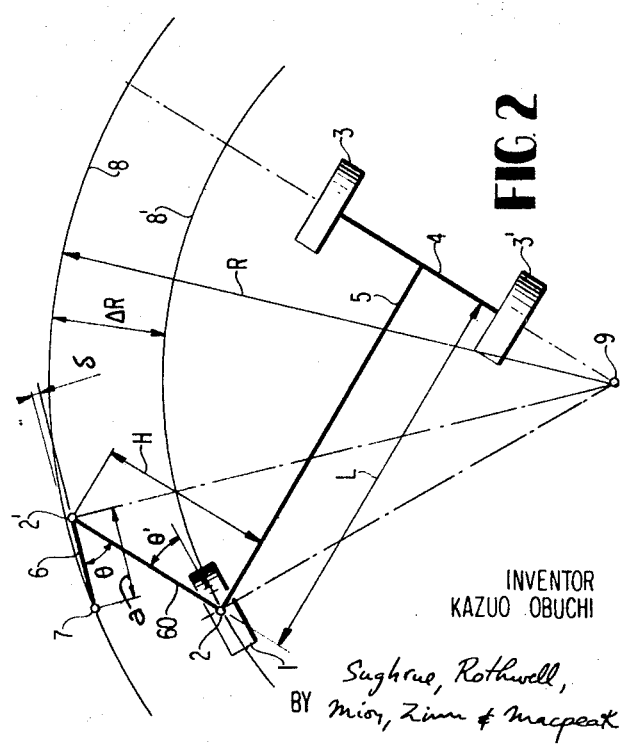
FIG. 2 is an explanatory plan view of the automatic contour tracing device in accordance with the present invention showing the operation thereof.

The principal construction of the device in accordance with the present invention is shown in FIG. 2. Like numerals refer to like elements in both FIGS. 1 and 2. As apparently shown in FIG. 2, the contour detector 7 is fixed to an end of an arm 6 pivotally mounted to rotate about an axis of rotation 2' which is located at a position spaced from the steering axis 2 of the steering wheel 1 in the direction parallel to the shaft 4 of the driving and/or idler wheels 3 and 3', and by the distance H. The arm 6 has length of $a$ and is inclined at angle θ with the second arm 10 extending between the axis of rotation 2' of the first arm 6 and the steering axis 2.

It should be noted that the axis of rotation 2' of the first arm 6 may be an imaginary axis located at the position above described and accordingly there can be a tool for processing the metal plate at that position. Thus, it becomes possible to provide a device for processing the metal plate along the contour 8 while tracing the contour 8. The axis of rotation 2' is referred to hereinafter as a tracing point.

Figure 1:
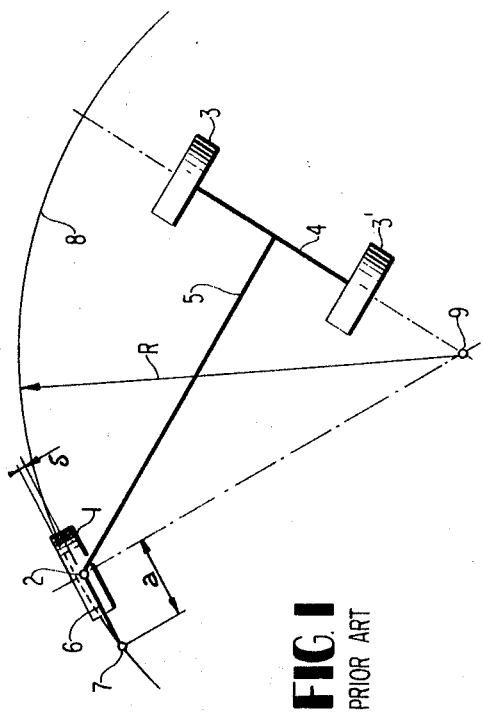
FIG. 1 is an explanatory plan view of the conventional automatic contour tracing device.

Now if the contour to be traced by the device is regarded approximately as the circular arc in FIG. 1, the tracing point and the steering wheel 1 of the automatic contour tracing device are moved along a couple of concentric circular arcs 8 and 8' having a common center of rotation at 9 in FIG. 2 and having different radius of curvature differing by Δ R. In such a construction of the device, there should be such a relationship between the distance H of the tracing point 2' from the steering axis 2, the foregoing angle θ, and the angle θ' between the first arm 6 and the second arm 60 as follows:

θ = θ' : when the radius of curvature of the contour to be traced is infinite tan θ − tan θ' = H/L : when the center of the curvature of the contour to be traced and the tracing device are on the same side of the contour tan θ' − tan θ = H/L : when the center of the curvature of the contour to be traced and the tracing device are on the opposite sides of the contour wherein L represents the distance from the steering axis 2 to the shaft of the driving and/or idler wheels 3 and 3'.

In FIG. 2, the line connecting the axis of rotation 2' of the arm 6 with the center of curvature 9 is held at right angles to the first arm 6, and the line perpendicular to the shaft 4 of the driving and/or idler wheels 3 and 3' is held at right angles to the second arm 60 extending between the steering axis 2 and the axis of rotation 2' of the arm 6.

By providing a means for maintaining the relation as shown by the above formula (2) between the angles $\theta$ and $\theta'$, the deviation of the tracing point from the contour to be traced is normally reduced, and an automatic contour tracing device in which the tracing point is not on the steering axis 2 can be realized.

The means for maintaining the relation as described above between the two angles $\theta$ and $\theta'$ can be constructed by a mechanical method easily through a conventional state of art. It is apparent that it is also possible to provide such a means through an electrical device including an analog or digital conversion, computing circuit.

Figure 4:
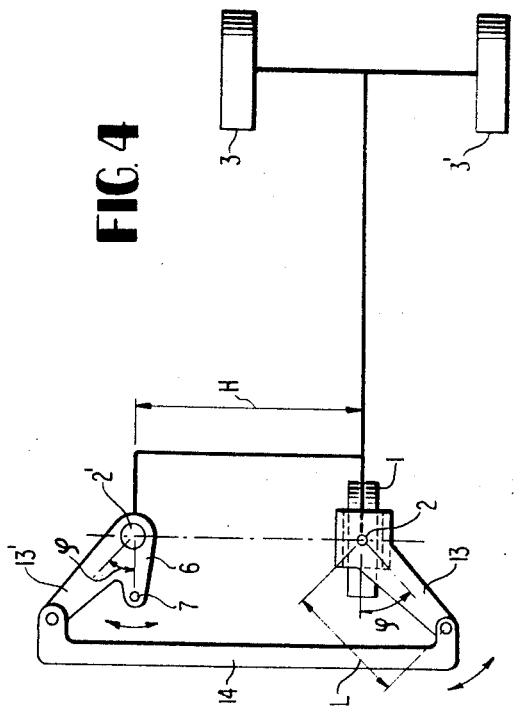
FIG. 4 is a plan view of another embodiment of the automatic contour tracing device in accordance with the present invention.
Figure 3:
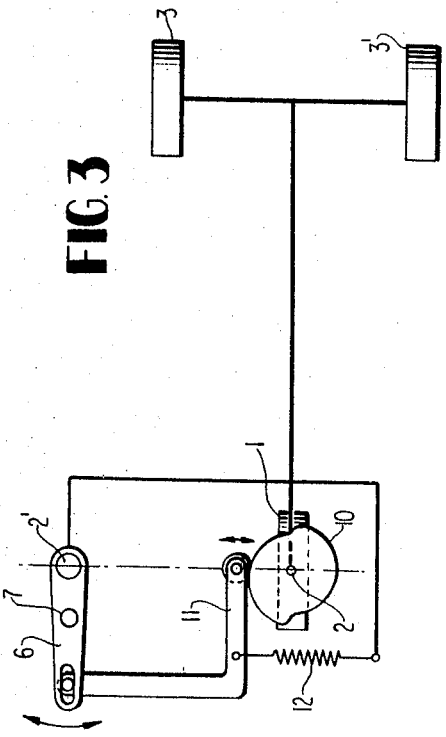
FIG. 3 is a plan view of an embodiment of the automatic contour tracing device in accordance with the present invention.

In FIGS. 3 and 4, some examples of the mechanical means for maintaining the above-described relationship are shown.

In the embodiment of the automatic contour tracing device shown in FIG. 3, a plate cam 10 which has a profile designed for moving the arm 6 having the detector 7 in the above-described relation represented by the second formula with the steering wheel 1 is mounted coaxially with the steering axis 2. The rotation of the plate cam 10 is converted into the above described motion of the arm through a cam follower 11 engaged with the arm at an end thereof and a tension spring 12 biasing the cam follower 11 onto the plate cam 10. Thus, the angular relation represented by prior formula is maintained regardless of the position of the steering wheel 1.

In the embodiment of the device of the present invention shown in FIG. 4, an auxiliary arm 13' is fixed to the arm 6 at an angle $\phi$ on the outer side therewith and another auxiliary arm 13 is fixed to the steering wheel 1 at an angle $\phi$ on the outer side therewith. Both auxiliary arms 13 and 13' are on the advancing side of the arm 6 and the steering wheel 1 and the front end of each auxiliary arm 13, 13' is connected in fixed relation to each other through a connecting rod 14. The relation represented by the formula is approximately maintained by selecting the value of the angle $\phi$ and the length $l$ of the auxiliary arms with respect to the distance between the two axes 2 and 2'.

In the embodiment shown in FIG. 3 employing a plate cam having the properly designed profile, a high technical skill is required for designing and making the cam while it is possible to make compensation through a wide range of declination of the arm 6 having the contour detector 7.

In the embodiment shown in FIG. 4 employing a linkage mechanism, the compensation is one of approximation and it is difficult to obtain a close approximation through a wide range of declination of the arms in spite of the simplicity and easiness in making of the construction of the compensating means. Nevertheless, according to an actual example made for experimentation, it was possible to control the error below 0.1 percent of the radius of curvature of the line to be followed by means utilizing the linkage mechanism in the case that the radius R, length L and H were satisfying the conditions: $L/R \leq 0.5$ and $H/L \geq 0.6$. Therefore, this embodiment shown in FIG. 4 is effective in the practical sense.

Although the plate cam 10 is fixed to the steering wheel 1 in the embodiment shown in FIG. 3 and described hereinabove, it should be understood that the plate cam 10 may be mounted on the arm 6 side. That is, the plate cam 10 may be provided on the axis of rotation 2' of the arm 6 and a cam follower 11 may engage the steering wheel 1. It is apparent that the same effect can be obtained also in this case as that obtained in the shown embodiment.

In such a modified case, however, there is a disadvantage that the plate cam provided on the arm 6 side disturbs the tool for processing to be mounted to the axis of rotation 2' of the arm 6.

In the description of the present invention referring to FIGS. 1 through 4, an automatic contour tracing device of a three-wheel type has been described with reference to the embodiment of the invention. And in the respective embodiments the rear wheels 3 and 3' have been described as to have a common axis of rotation. But any type of rear wheels may be employed in the device of the present invention so long as the projections of the respective axis of rotation thereof on the horizontal plane are on one straight line. Accordingly it is possible to apply the present invention for a contour tracing device having more than three rear wheels as long as the above relation of shafts is made.

It should be understood that the steering wheel as well may not be limited to the one-wheel type, but may be of the several-wheel type so long as the aforesaid relation between the angles and arms is satisfied.

What is claimed is:

1. An automatic contour tracing device comprising: a plurality of rear wheels which have an axis of rotation on a common vertical plane, a steering wheel rotatable about a steering axis spaced at a fixed distance $L$ from said vertical plane, a first arm pivotable about a tracing point which is spaced at a fixed distance $H$ from said steering axis, a contour detecting means mounted at the free end of said first arm, a second arm connecting said tracing point with said steering axis, means for driving at least one of said rear wheels and steering wheel, and a compensating mechanism for controlling said arms such that the relation as represented by the following formula is satisfied:

$\theta = \theta'$ : when the radius of curvature of the contour to be traced is infinite, $\tan \theta - \tan \theta' = H/L$ : when the center of the curvature of the contour to be traced and the tracing device are on the same side of the contour, and $\tan \theta' - \tan \theta = H/L$ : when the center of the curvature of the contour to be traced and the tracing device are on the opposite sides of the contour, wherein $\theta$ is an angle between said first arm and said second arm, and $\theta'$ is an angle between said second arm and said steering wheel.

2. An automatic contour tracing device as claimed in claim 1 wherein said compensating mechanism comprises a plate cam rotatably mounted on said steering axis, a cam follower engaging one end of said second arm, and biasing means for biasing said cam follower onto the periphery of said plate cam.

3. An automatic contour tracking device as claimed in claim 1 wherein said compensating mechanism comprises a plate cam mounted on said tracing point, a cam follower engaging said second arm, and biasing means for biasing said follower onto the periphery of said plate cam.

4. An automatic contour tracing device as claimed in claim 1 wherein said compensating mechanism comprises a compensating arm fixed to said steering wheel, an extension member secured to said first arm, and a connecting member connecting said compensating arm with said extension member and being journalled at the opposite ends thereof with said compensating arm and extension member.

* * * * *